No. 621,308. Patented Mar. 14, 1899.
J. T. MARLIN.
LABELING MACHINE.
(Application filed Sept. 23, 1897.)
(No Model.) 6 Sheets—Sheet 1.

Witnesses:
M. R. Remley.
C. Y. Thorpe.

Inventor
J. T. Marlin,
By Higdon & Higdon,
Attys.

No. 621,308. Patented Mar. 14, 1899.
J. T. MARLIN.
LABELING MACHINE.
(Application filed Sept. 23, 1897.)
(No Model.) 6 Sheets—Sheet 2.
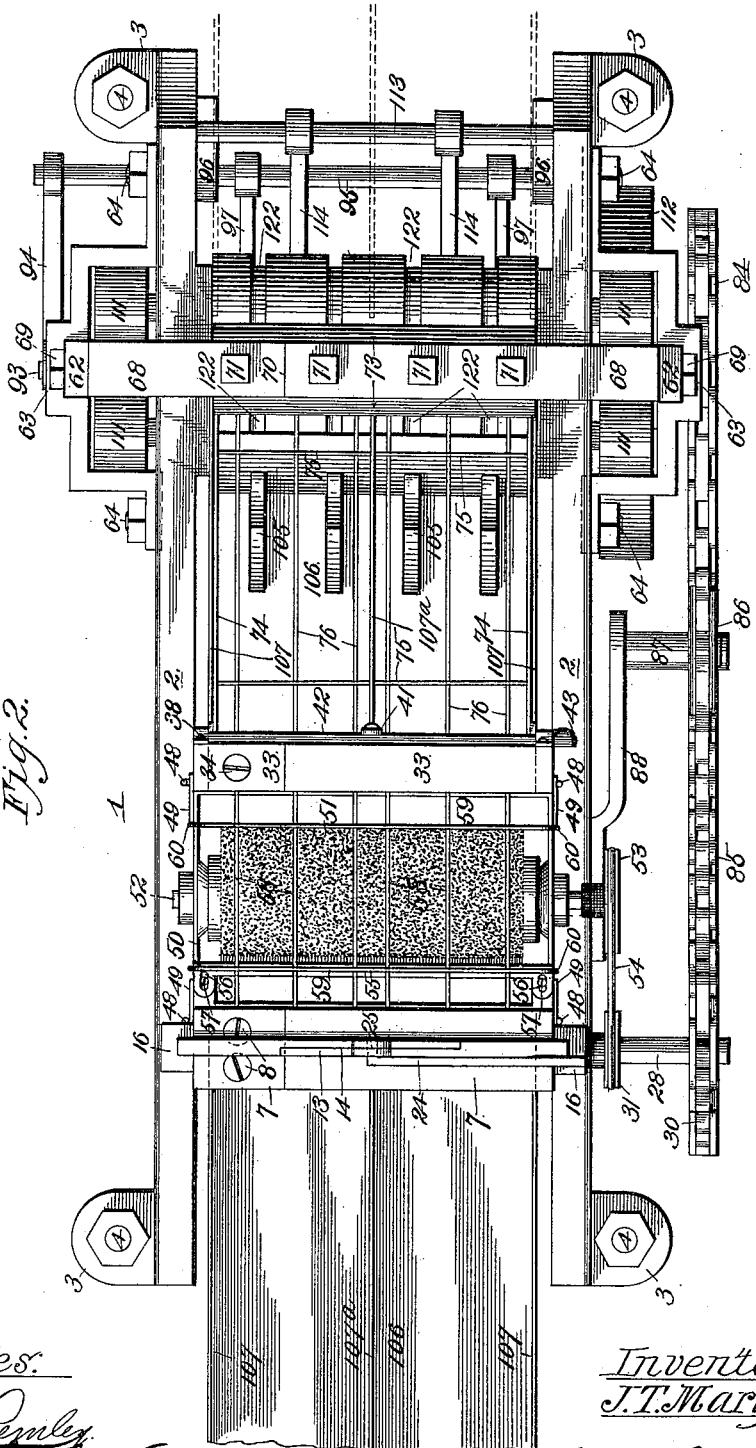

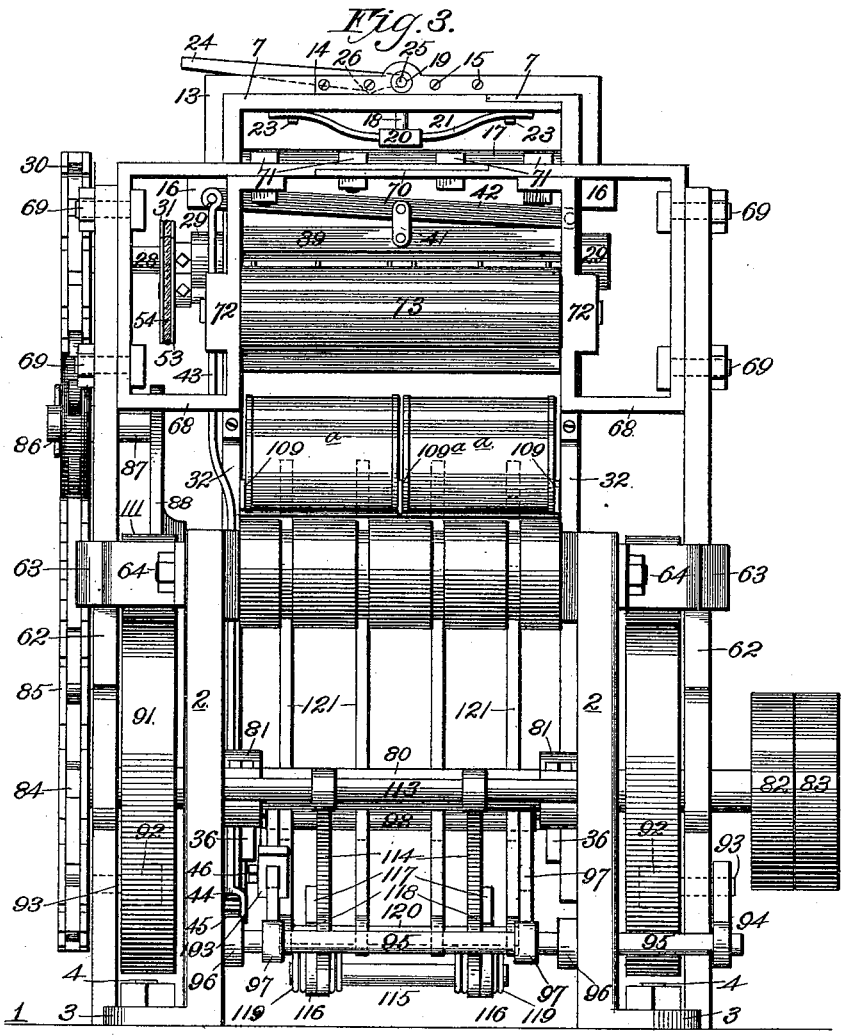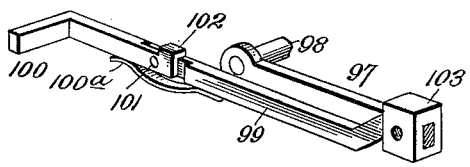

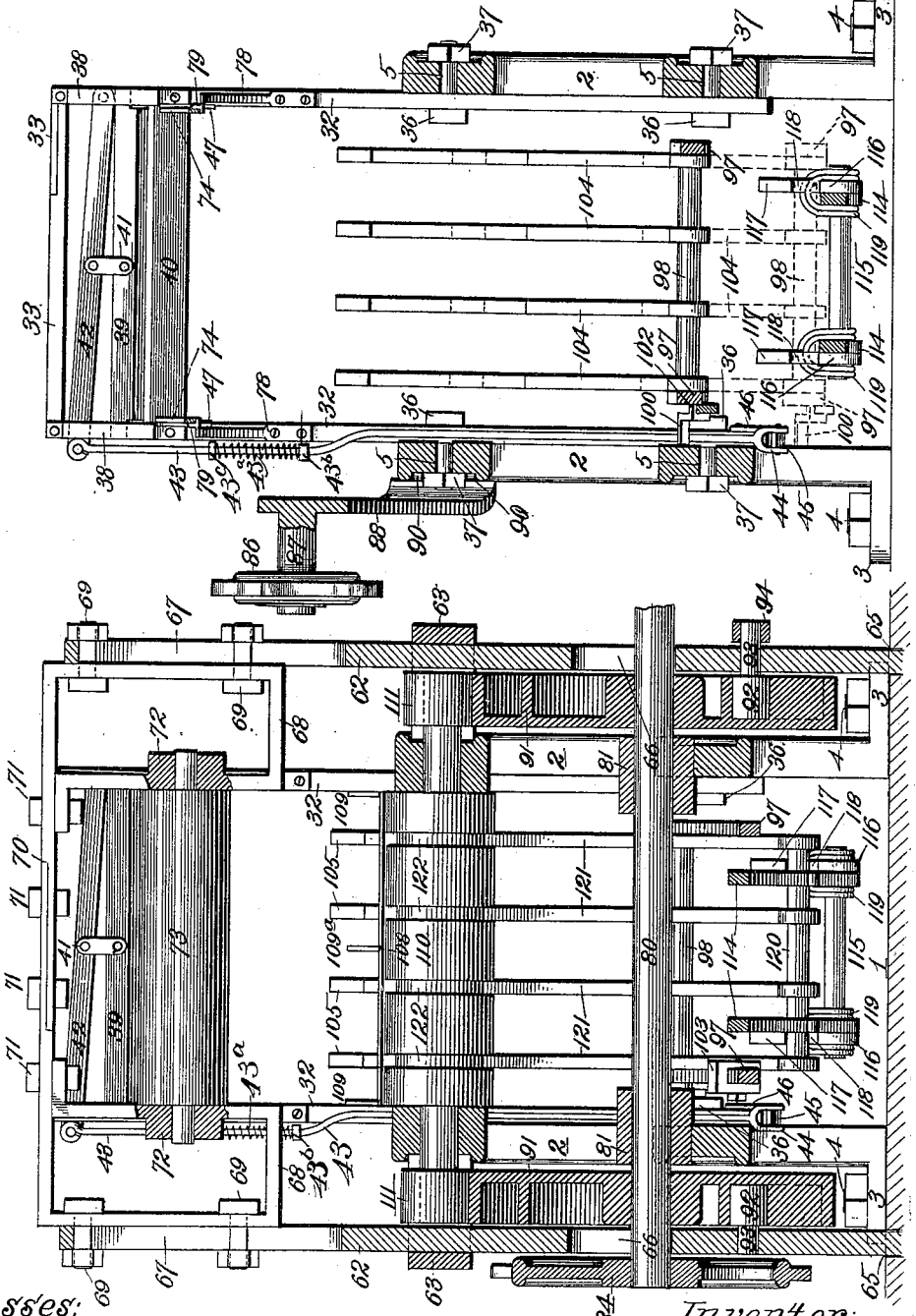

No. 621,308. Patented Mar. 14, 1899.
J. T. MARLIN.
LABELING MACHINE.
(Application filed Sept. 23, 1897.)
(No Model.) 6 Sheets—Sheet 5.
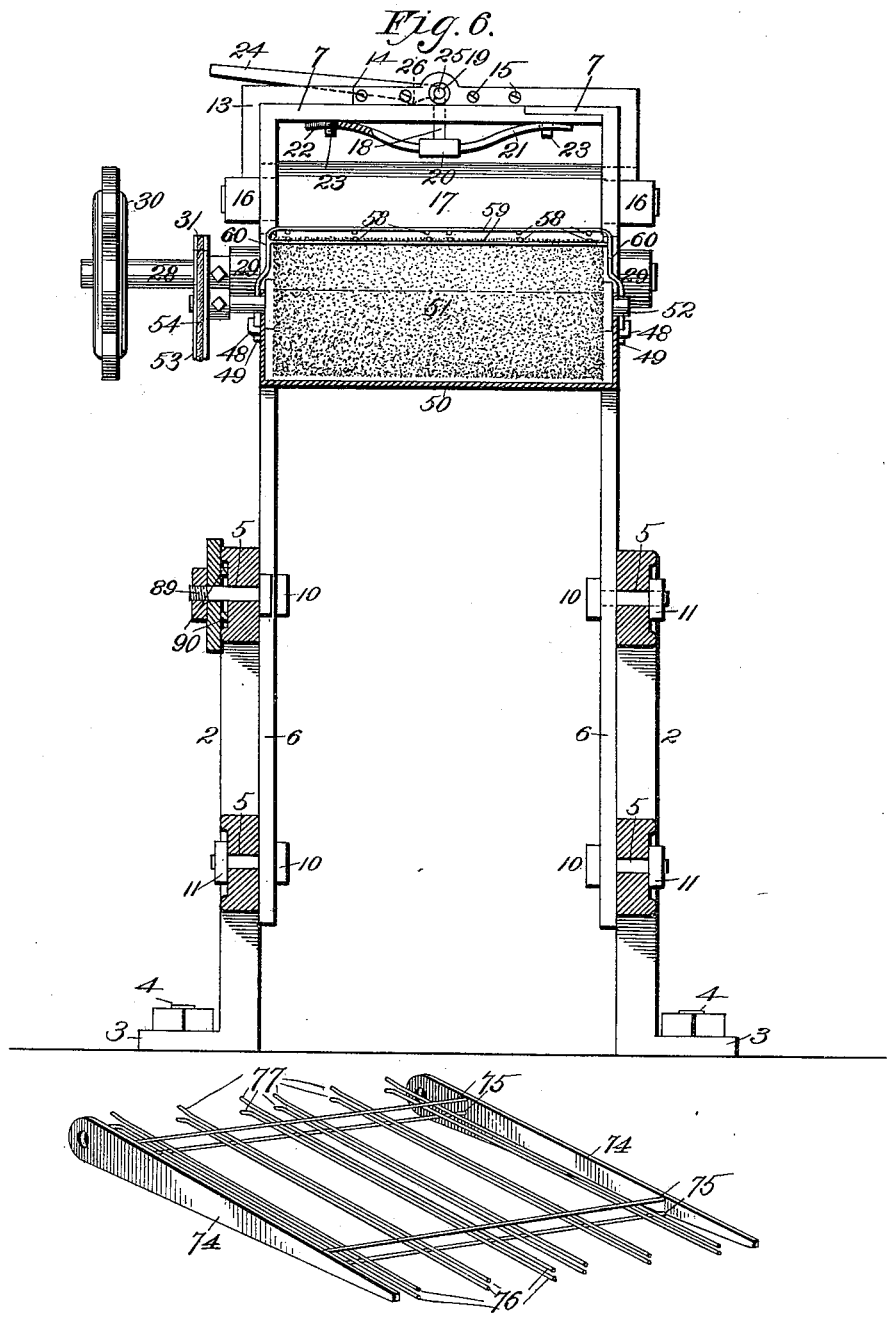

No. 621,308. Patented Mar. 14, 1899.
J. T. MARLIN.
LABELING MACHINE.
(Application filed Sept. 23, 1897.)
(No Model.) 6 Sheets—Sheet 6.

Witnesses:
Inventor
J. T. Marlin
By Higdon & Higdon
Attys.

THE NORRIS PETERS CO., PHOTO-LITHO., WASHINGTON, D. C.

UNITED STATES PATENT OFFICE.

JAMES T. MARLIN, OF KANSAS CITY, MISSOURI.

LABELING-MACHINE.

SPECIFICATION forming part of Letters Patent No. 621,308, dated March 14, 1899.

Application filed September 23, 1897. Serial No. 652,682. (No model.)

*To all whom it may concern:*

Be it known that I, JAMES T. MARLIN, of Kansas City, Jackson county, Missouri, have invented certain new and useful Improvements in Labeling-Machines, of which the following is a full, clear, and exact description, reference being had to the accompanying drawings, forming a part thereof.

My invention relates to machines for labeling cans, bottles, and the like; and my object is to produce a machine of this character which is rapid, positive, and reliable in action.

To this end the invention consists in certain novel and peculiar features of construction and organization, as will be hereinafter described and claimed.

In order that the invention may be fully understood, I will proceed to describe it with reference to the accompanying drawings, in which—

Figure 1:
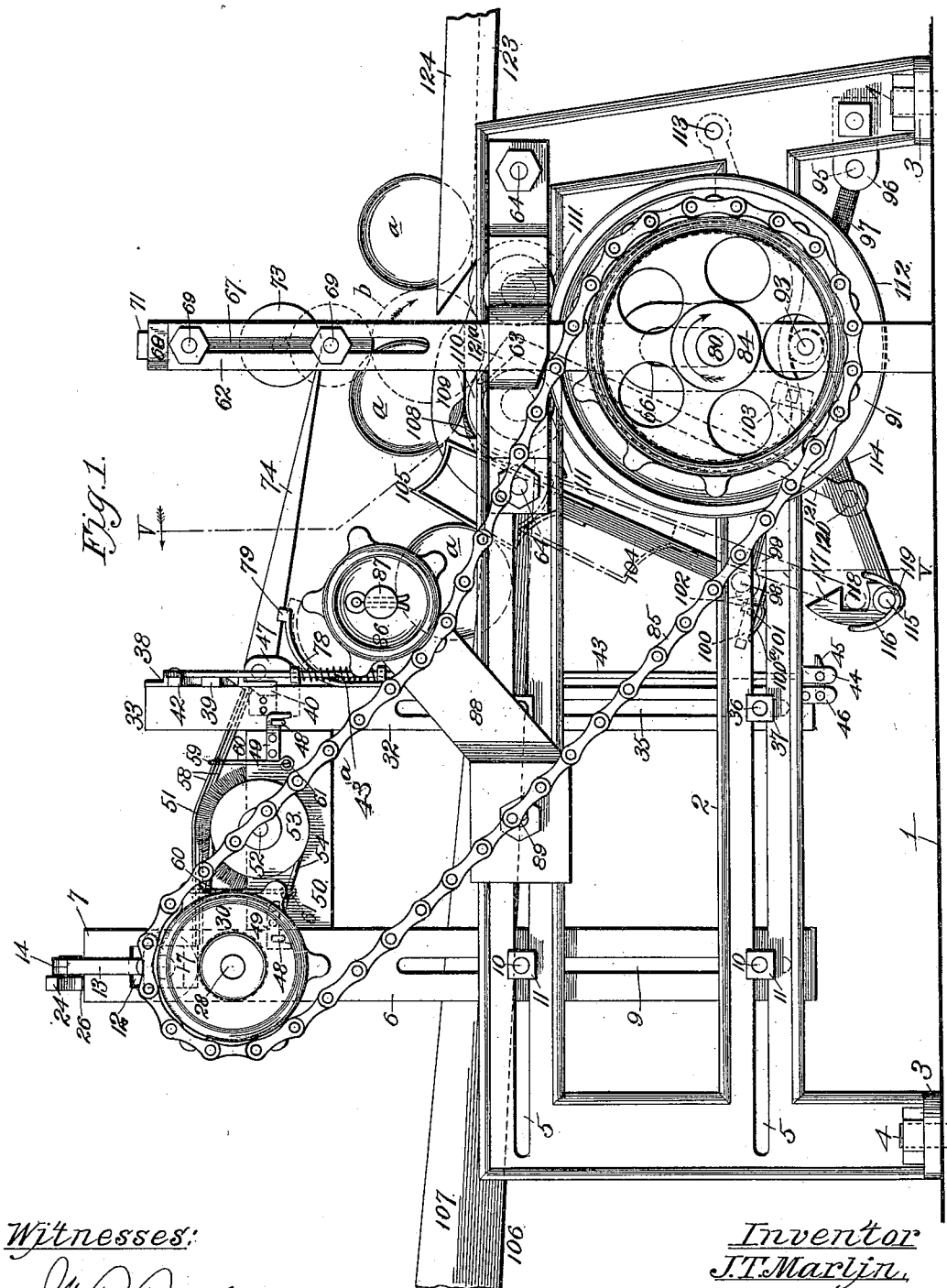
Figure 9:
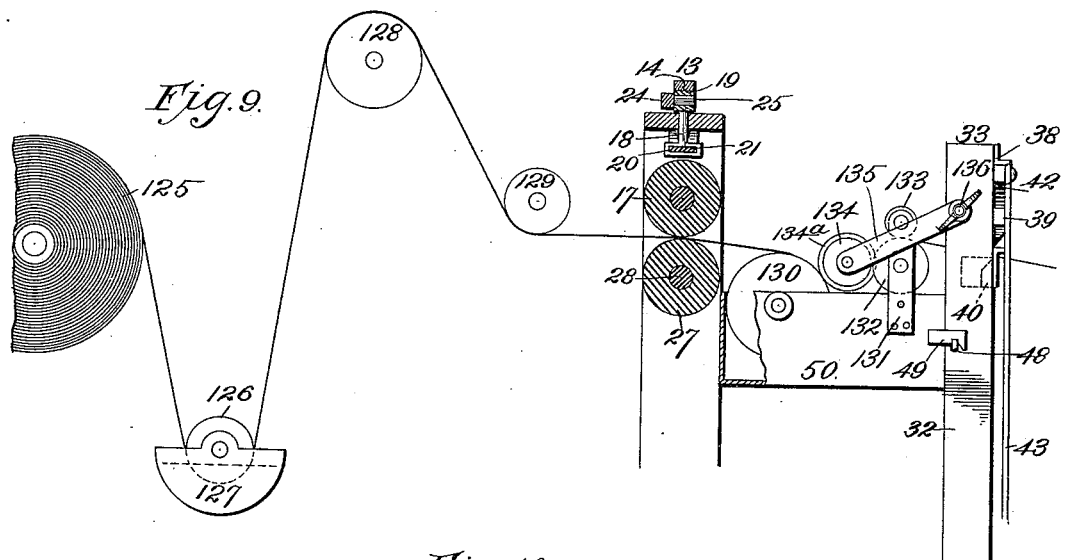
Figure 10:
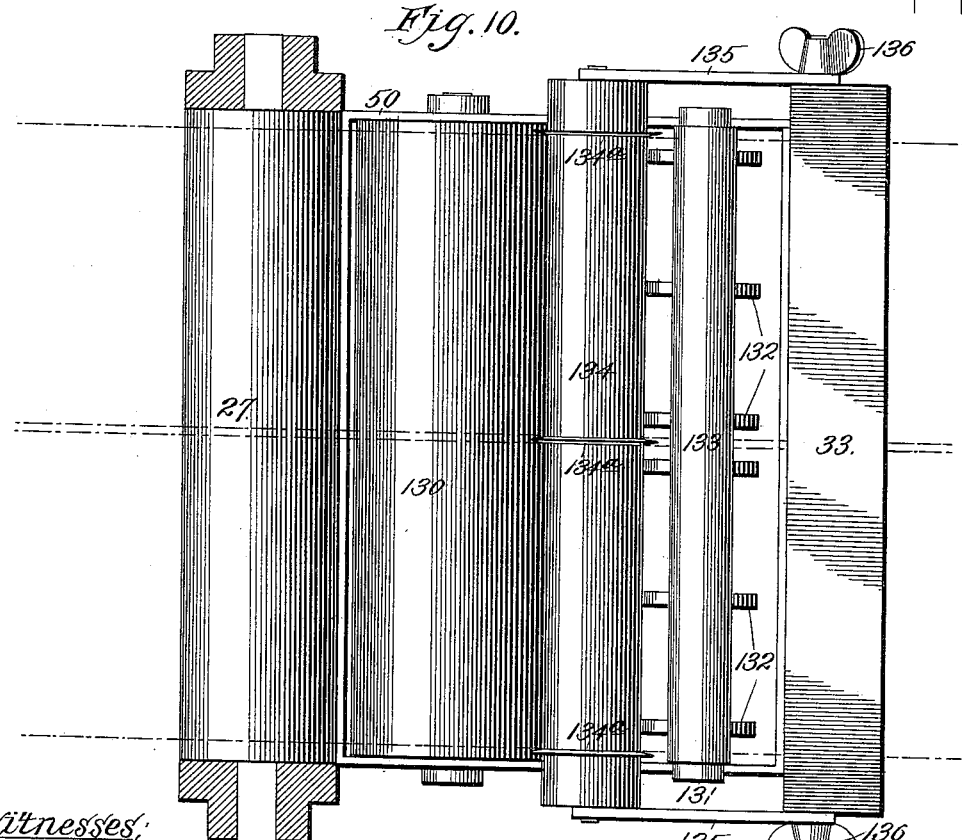

Figure 1 represents in side elevation a labeling-machine embodying my invention. Fig. 2 is a top plan view of the same with the table or plane omitted upon which the labeled can rolls from the machine. Fig. 3 is a front view of the machine with said table or plane omitted. Fig. 4 is a vertical transverse section of the machine, taken in the plane of the drive-shaft. Fig. 5 is a vertical transverse section taken on the line V V of Fig. 1, with the drive-chain omitted. Fig. 6 is a vertical transverse section taken through the paste-fount. Fig. 7 is a detail perspective view of the pivoted label-guide. Fig. 8 is a detail perspective of the knife-actuating frame. Fig. 9 is a view, partly in section and partly in side elevation, of a modified form of pasting appliance and of the means to stretch the label evenly before the paste is applied. Fig. 10 is a top plan view of such pasting appliance.

In the said drawings, where similar reference-numerals refer to corresponding parts, 1 designates a table or base of any suitable or preferred construction.

2 designates a pair of similar parallel frames provided with feet or flanges 3, secured firmly to the table by means of clamping-bolts 4 or in any other suitable manner. These rigid frames constitute the immovable portion of my machine, and they are each provided for the greater portion of their length with horizontal and longitudinally-extending slots 5 in different horizontal planes, the corresponding slots of each frame, however, being horizontally alined.

6 designates a pair of vertical standards, which are provided at their upper ends with horizontal arms 7, stepped into each other and secured by means of screw-bolts 8 or their equivalents, so as to constitute a single rigid inverted-U-shaped standard, which is provided in each arm 6 with a vertical slot 9. This frame fits snugly in the stationary framework hereinbefore described, as shown most clearly in Fig. 6, and at the intersecting points of slots 5 and 9 bolts 10 extend through said standard and framework and are engaged by clamping-bolts 11, at their outer ends preferably. By this construction it is obvious that the inverted-U-shaped standard may be vertically or longitudinally adjusted in the stationary framework. The arms 6 of said inverted-U-shaped framework are provided in their upper ends with vertical slots 12.

An inverted-U-shaped frame 13 is of size to embrace externally the upper end of the U-shaped standard, and it is also composed of two members the horizontal arms of which are stepped into each other, as shown at 14, and are secured by means of screw-bolts 15 or their equivalents. The vertical arms of said frame 13 terminate in the rectangular journal-boxes 16, which engage and are adapted to reciprocate vertically in the slots 12 for a purpose which will hereinafter appear, as shown most clearly in Figs. 1 and 6. It will be obvious also, in order to dispose the journal-boxes 16 in the slots 12, that the "slide-frame," as the frame 13 will be hereinafter termed, should be composed of two or more sections secured together, or if said frame were cast in a single piece then it must be secured in position before arms 7 of the standards 6 are secured together. Said slide-frame carries the upper feed-roller 17, the shaft or trunnions of which are journaled in said boxes 16. In order to hold said feed-roller depressed with a yielding pressure, so as to accommodate any hard parts in the label or any foreign particles adhering thereto, I employ the following mechanism.

18 designates a rod which extends vertically through the center of the inverted-U- shaped standard, and is provided at its upper end with a hollow cylindrical head 19, extending longitudinally of the machine, fitting in a hole in the horizontal partion of the frame 13, and at its lower end with a tubular box 20, extending transversely of the machine. A flat spring 21 is carried by said tubular box and has its longitudinally-slotted ends 22 exerting pressure against the bridge part of the inverted-U-shaped standard, and the spring is maintained in such position by the guide-pins 23, which depend from said bridge part through said slotted ends, as shown in Fig. 6. To overcome the pressure of said spring and elevate the feed-roller 17 when necessary or desirable, I employ a lever 24, which is provided with a cylindrical arm 25, journaled in the hollow head of the rod 18 and provided with a lug or its equivalent 26, which fulcrums upon the upper side of said bridge-bar, so that by pressing downward upon the outer end of the lever the resistance of the spring 21 will be overcome and the slide-frame, together with the feed-roller, elevated, as will be readily understood. When the lever is released, the spring returns the slide-frame to its depressed position.

Vertically below and acting in conjunction with the feed-roller 17 is a similar, but stationary, feed-roller 27, the shaft 28 of which is journaled in enlargements or boxes 29, cast integral, preferably, with the inverted-U-shaped standard, and keyed or otherwise rigidly secured upon one end of said shaft are a sprocket-wheel 30 and a belt-wheel 31, the latter being located inward of the former.

A second and smaller inverted-U-shaped standard is composed of vertical arms 32 and horizontal arms 33, the latter being located at the upper end of the former and stepped into each other and secured by means of screw-bolts or their equivalents 34. (See Figs. 2 and 5.) This standard is of the same width as that first described, so as to fit snugly in the stationary framework, but, as shown, is not as large or massive, as no particular strain is imposed upon it. Said frame is arranged vertically and some distance in advance of the inverted-U-shaped standard and is provided with vertical slots 35, through which, at their points of intersection with the slots 5, bolts 36 extend and are engaged by clamping-nuts 37, so that said standard may be adjusted longitudinally or vertically. Secured to the front edge of the arms 32 are guide-brackets 38, so as to provide vertical slots to receive the ends of the reciprocatory knife 39, extending transversely of said inverted-U-shaped standard. Said knife operates in conjunction with a companion or stationary knife 40, which is secured to said standard by rivets or in any other suitable manner. (See Fig. 1.) The reciprocatory knife is pivotally connected at the middle by a link 41 with the lever 42, pivoted at one end, as shown in Fig. 5, in one of said guide-slots and connected pivotally at its free end with the vertical rod 43, extending parallel with one vertical arm 32 of the standard. The lower end of said rod is preferably bifurcated and is pivotally connected, as shown at 44, to the beveled dog 45, which dog is pivoted at its rear end to the plates 46, depending rigidly from said arm 32 of the standard. (See Figs. 1, 3, 4, and 5.) The pivotal operation of this dog by means to be hereinafter described causes the reciprocation of the knife and the cutting of the label at the proper time. The knife 39 is instantly elevated after severing the lapel-web by means of an expansive coil-spring $43^a$, mounted on rod 43 and bearing, respectively, at its lower ends against a bracket $43^b$, secured to the adjacent arm 32, and at its upper end against a nut $43^c$ upon said rod.

50 designates a paste-fount in the form of a rectangular box and located at a suitable height between the standards 6 and 32. A rotary brush 51 is partially submerged in the paste of said fount and has its shaft 52 journaled in the sides of the latter. A belt-wheel 53, mounted upon one end of said shaft, is connected by belt 54 with the similar belt-wheel 31 upon shaft 28, which rotates constantly. A series of downwardly-disposed hooks 49, secured to the opposite sides of the paste-fount, engage upwardly-disposed hooks 48, projecting from standards 6 and 32, and also secured to the latter in advance of the stationary knife are angle-brackets 47, for a purpose which will be hereinafter explained.

To guard against a superfluous application of paste to the roller, I employ a transversely-extending scraper 55, which is in peripheral engagement with the brush just above the point where it emerges from the paste, and consequently strips it of superfluous paste and insures that the label shall receive a thin and evenly-applied coat. This scraper, provided with slots 56, is mounted upon clamping-screws 57, projecting from the fount, in order that it may be adjusted toward or from the brush to regulate the quantity of paste applied to the label. This is essential, as thick heavy labels will require a thicker coat of paste than thin flexible ones.

As the label is fed continuously forward by the rollers 17 and 27, it must be held firmly and reliably down upon the rotary brush in order that it may receive on practically its entire under or unprinted surface an even coat of paste, and to accomplish this I employ a skeleton frame constructed as follows: 58 designates two sets of longitudinal wires, one set being located vertically below and parallel to the other and the lower set cutting slightly into the periphery of the brush, as shown clearly in Fig. 1. These wires in side view are of obtuse-angled form, with the rear or receiving ends arranged to receive the label as it emerges from the feed-rollers and with their front ends adapted to deliver the label between the knives 39 and 40. Said wires are preferably maintained in such positions by means of cross-wires 59, secured to the wires 58 above and below in any suitable manner, so as not to interfere with the movement of the label. One of the cross-wires is bent downwardly to form the vertical arms 60, which are secured, preferably, to the sides of the fount, as shown at 61, to support said stationary guide-frame in the position described. 62 designates a pair of vertical standards which are located in advance of the standards 32 and are arranged externally of the framework, being guided in brackets 63, secured to the outer sides of the framework by clamping-bolts 64, and openings 65 in the table or base 1. Below the guide-bracket 63 said standards are provided with vertical slots 66 and in their upper ends with vertical slots 67. A pair of rectangular frames 68 are adjustably clamped to the inner sides of said standards by means of bolts 69, which extend through said slots 67 and are connected rigidly together by inwardly-projecting arms at their upper ends, said arms being stepped into one another, as shown at 70, and so secured by bolts 71 or in any other suitable manner. The inner vertical arms of said rectangular frames are preferably enlarged or thickened, as shown at 72, to provide journals for the spindles or shaft of the roller 73 for pressing the label smoothly down upon the can, as will be hereinafter explained. To convey the label to the proper point for said roller to act effectively upon it, I employ a pivoted label-guide constructed as follows: 74 designates a pair of forwardly-tapering parallel plates which are connected at suitable points from their front and rear ends by transverse wires or strips 75, said wires or strips being arranged, preferably, in pairs and one above the other. (See Fig. 7.) When used in connection with a machine for labeling two cans at once, this skeleton frame will preferably have a central longitudinal partition-plate like plates 74; but such plate has been omitted from the drawings to render them less obscure. Upon opposite sides of said real or imaginary partition-plate 74 two sets of longitudinal and vertically-alined guide-wires 76 are secured in any suitable manner between and to the wires 75, and the rear or receiving ends of said wires 76 are bent, as shown at 77, so as to provide a flaring mouth or mouths to receive the advanced end of the label-web immediately after the knife has severed that part of the web from its body which occupies the pivotal guide-frame just described, said guide-frame being pivoted at its rear end to and between the angle-brackets 47, hereinbefore referred to. (See Fig. 4.) The front or delivery end of this pivoted guide-frame is held with a yielding pressure up against the under side of the roller 73 by means of a pair of springs 78, secured to the arms 32 of the standard hereinbefore described, and said springs are provided with side flanges 79, which tend to prevent lateral movement of said frame.

80 designates a drive-shaft for the machine. It extends transversely and is journaled in bearing-boxes 81, formed in or upon the stationary framework. (See Fig. 4.) Upon one end are mounted the fast and loose pulleys 82 and 83 and upon the other the sprocket-wheel 84, which is connected by the power-transmitting chain 85 with the sprocket-wheel 30 upon shaft 28, and said chain is tensioned by engagement with the idle sprocket-wheel 86, journaled upon the stub-shaft 87, projecting from the bracket 88, secured to the stationary frame by means of a clamping-bolt 89, extending through it and through one of the slots 5. A single clamping-bolt is sufficient for this purpose, owing to the fact that said bracket is provided with a pair of longitudinal ribs 90, which fit snugly in the channel framework, as shown clearly in Figs. 5 and 6.

Keyed upon the shaft 80 between the framework and the reciprocatory standards 62 are a pair of large grooved cam-wheels 91, and engaging the grooves of said wheels are a pair of antifriction-rollers 92, journaled upon pins 93, projecting rigidly from said standards 62, in order that the rotary movement of the cam-wheel will impart a vertical reciprocatory movement to said standards and the roller 73, and, consequently, once in each revolution cause the depression of said pivoted label-guide. Mounted pivotally upon the projecting end of one of the pins 93 is the longitudinally-slotted end of an arm 94 of the rock-shaft 95, extending transversely of the framework near its front and lower corner and journaled in brackets 96, clamped rigidly to the framework. A pair of parallel arms 97 are mounted rigidly upon said rock-shaft and project rearwardly therefrom, being adapted in the operation of the machine to swing in a plane which is vertical and longitudinal of the machine. The parts thus described constitute a rock-frame actuated directly by the reciprocatory standards, and its rear or free end carries pivotally the transverse shaft 98, which connects the arms 97 (see Figs. 1 and 8) for a purpose which will presently appear. This rock-frame is provided with an extension-arm at one side in order that it may accommodate the position of the standard provided with arms 32, which is adjusted with respect to the roller 73 to accommodate the length of label employed. This extension-arm is composed of two sections 99 and 100, the arm 100 being of angular form and pivoted, as shown at 101, preferably, to the outer side of the arm 99. It is also provided, above and slightly rearward of its pivotal point, with a shoulder 102, which overhangs the arm 99, so as to permit the depression of the free end of the arm 100 with respect to the arm 99, but not permit its elevation above the plane of said arm 99, (for a purpose which will presently appear,) due to the pressure of the spring 100$^a$, secured to the member 99 and pressing continuously upward upon the member 100. Said extension-arm is preferably provided with a sleeve 103 at its rear end, which is adjustably mounted upon an arm 97 of the rock-frame, a set-screw (not shown) or equivalent means being employed to secure said arm at the proper point.

Mounted upon the transverse rod 98, carried by the rock-frame, are a series of push-arms 104, the upper portions of which preferably are of skeleton construction and form concave surfaces 105 at their upper ends, the rear ends of said surfaces, with respect to the movement of the label, being much higher than the front ends, so as to insure that the cans roll forward at the proper time as they are successively elevated by said push-arms in a manner to be hereinafter explained. A number of said cans (lettered $a$) are illustrated in Fig. 1 and a pair in Fig. 3, and in order to deliver them into the machine at the proper point I employ an inclined plane or table 106, provided with side guards 107 and in case of a double machine with a central partition 107$^a$. This plane or table slopes forward, as shown in Fig. 1, to within a short distance of the reciprocating standards 62 and then curves upwardly for a distance of about ninety degrees, as shown at 108. (See Fig. 1.) The side guards 107 and the partition or central guard 107$^a$ also curve upwardly in the same manner, as shown at 109 and 109$^a$; but said guards preferably project forwardly beyond the end of the curved extension 108 to about the plane of the front edges of the standard 62, (see Fig. 1,) in order that the cans may assume their proper relative positions upon and between the pair of friction-rolls 110, the shafts of which are journaled in the stationary framework and carry at their outer ends the rollers 111, which are driven in the same direction by frictional contact with the circular periphery of the cam-wheels 91, said wheels being preferably provided with peripheral pads 112, of rubber or equivalent material, in order to make the rotary action of said rollers more positive and reliable. The rollers 73 and 110 are preferably of rubber, but may be of any other suitable or preferred material.

Extending transversely of the framework at its front end and in a higher plane than the rock-shaft 95 is a shaft 113, journaled in said framework in any suitable manner. A pair of arms 114 are secured rigidly upon said shaft and project rearwardly of the machine and between the arms 97. Said arms 114 are adapted to swing in a vertical plane and are connected at their rear ends by a cross-rod 115. Mounted pivotally upon said rod at the outer ends of the arms 114 are a pair of dogs 116, which are provided with downwardly and forwardly beveled shoulders 117, leading to the recesses or notches 118, formed in the front edges of said dogs. The dogs are maintained at all times in an approximately vertical position by means of the springs 119, which are coiled upon said shaft and bear at their opposite ends against the arms 114 and said dogs. Said springs, however, permit said dogs to yield and swing to the rear under an overcoming pressure applied by the rod 98 at regular periods in the operation, and owing to the fact that the pivotal point of the rock-frame and the arms 114 are eccentric to each other at equally regular periods the said shaft becomes disengaged from the recesses of said dogs.

The rod 120 is journaled in the arms 114$^a$ a suitable distance to the rear of the standards 62, and mounted upon said shaft at equal distances apart is a series of kickers, comprising the upwardly and forwardly inclined arms 121, terminating in upwardly and rearwardly extending foot portions 121$^a$, which occupy positions between and in the registering annular grooves 122 of the friction-rolls 110, as shown in Figs. 1, 2, and 3, said kickers by preference corresponding in number with and occupying the same vertical plane as the push-arms hereinbefore described. These kickers are adapted immediately after a can has been completely revolved after having assumed the position shown in dotted lines $b$, Fig. 1, at which time the label is affixed, to rise and in rising to strike the can rearward of its vertical center and cause it to roll forwardly over the advanced roll 110 and upon the inclined plane 123, from which it may be removed by hand or in any other suitable manner. The table 123 is preferably provided with guard-flanges 124 to guard against the cans falling to the floor.

The labels will be printed, preferably, in the form of a continuous strip or web and arranged in the form of rolls, as shown at 125, from which the web may extend directly between the feed-rollers 17 and 27. I prefer, however, to uniformly dampen and stretch the web before it reaches said roll, and I have found in practice that this treatment always insures a smooth and even pasting of the label upon the can, because when all of the stretch is taken out of the paper it has no chance to crinkle. This stretching of the paper may be accomplished in various ways, one of the simplest of which is illustrated in Fig. 9. In this case I employ a roller 126, journaled in a suitable tank 127, containing steam, water, or other liquid, through which said paper must pass. A second roller 128 is located a suitable distance from the roller 126, and a third roller 129 may be arranged adjacent to the feed-roller. With these rollers 126, 128, and 129 the label is engaged, so that it shall first be dampened and then given an opportunity to stretch before it reaches the feed-rollers, in order that when the paste is applied to the unprinted side of the web the latter will not stretch any farther as it is drawn through the machine and applied to the can. This dampening and stretching process may or may not be used in connection with the rotary pasting-brush or with the rotary pasting-roller 130 substituted for said brush. If the pasting-roller is employed, I prefer to use instead of the skeleton wire-guide (illustrated most clearly in Figs. 1 and 2) a pair of friction-rollers (see Figs. 9 and 10) journaled in standards 131, secured to the paste-fount, said rollers being numbered 132 and 133, respectively, the former consisting simply of a series of disks and constituting, therefore, a skeleton roller, in order that its contact with the unprinted or pasted side of the label-web may be in lines only, and consequently will not scrape or remove sufficient paste from the web to interfere with its proper and reliable adhesion to a can when the label is placed thereon.

The relative positions of the standards and various parts will be determined according to the diameter of the can to be labeled, as will the vertical adjustment of the roller 73, the machine being constructed of sufficient size to accommodate the label of greatest length to be employed. The chain 85 will also be of sufficient length to accommodate any position of the standards and the slack taken up where necessary by adjusting the bracket carrying the tension-sprocket 86. The machine will be made to operate so that the knife will sever the label-web to form a complete and free label at the instant said label is taken hold of by the "wrapping-roller" 73, as the roller which presses the label upon the can will be hereinafter termed, and the web will be fed into the machine at such speed that the knife will always sever it at predetermined points—viz., upon a line, real or imaginary, separating two labels.

In practice the end of the label-web being fed the requisite distance between the feed-rollers 17 and 27, the belt (not shown) is shifted from the loose to the fast pulley, a train of cans $a$ being first arranged upon the table or plane 106, as will be readily understood. Immediately the shifting of the belt takes place the shaft 80 begins to revolve in the direction indicated by the arrow, Fig. 1. The operation of said shaft for the greater portion of a circle performs no function except to continuously drive the shaft 28, and therefore the feed-rollers and the pasting-brush, which, rotating in the same direction, presses against the under side of the web as it is forced forwardly by said feed-rolls and supplies a coat of paste to its under or unprinted side. Shortly before the front end of the label-web coincides with the knife-edges the antifriction-rollers 92 upon pins 93 have reached the point of the grooved cams nearest their axes, and as a result the reciprocatory standards 62, together with the wrapping-roller 73 and the rock-frame hereinbefore described, have assumed their most elevated positions, and as the cam-wheels continue to rotate said parts commence their downward movement and almost reach their utmost limit of movement in that direction at the instant that the front end of the label-web reaches the knife-point, and the knife 39 is moved downward by the engagement of the arm or member 100 of the rock-frame extension with the dog 45, which it pivotally depresses and releases at the instant the depression of said reciprocatory standards 62, roller 73, and rock-frame is accomplished. The rod 98 of said rock-frame clears the shoulders 117 and enters the recesses 118 of the dogs 116, so as to lock said parts in their depressed position until the cam-wheels have completed the greater part of a revolution and the eccentric portions of their grooves, by engagement with the rollers 92, begin to reëlevate them, this reëlevating operation also raising the rock-arms 114. Just before the said parts have reached their highest limit of motion, however, by the approach of the said rollers to the points of the grooves nearest the axes of the cam-wheels the rod 98 becomes completely disconnected from the recesses 118 of said dogs, due to the fact that their lines of movement intersect and do not parallel, and permits the dog-carrying arms 114, together with the kickers, to drop back to their original positions, as shown clearly in Fig. 1. In the upward movement of the rock-frame the member 100 of its extension-arm strikes the beveled side of the dog 45 without affecting its position, because said member yields to the contact by breaking at its joint or pivotal point, this action being permitted by the spring $100^a$, which immediately thereafter returns said member to its original position as soon as the rock-frame attains a sufficient altitude at its free end to cause the broken-joint extension to be withdrawn from contact with said dog. The foremost of the cams $a$ during the preceding operation has been elevated by the push-arms and deposited or rolled into the position shown by dotted lines $b$, Fig. 1, so as to be ready to receive the label when pressed down upon it by the wrapping-roller 73. By the time the knife is again depressed, in a manner hereinbefore described, the label-web has been forced forward until its front end clears the front end of the guide 74 and has been pressed by the descent of the roller 73 firmly down upon a can introduced by the previous upward movement of the push-arms 104 into the position shown in dotted lines $b$, and immediately the pressure of the label-wrapping roller is felt upon said can the friction-rollers 110 cause the can to rotate rapidly, as indicated by the arrow, Fig. 1, and cause at the same instant the rotation of the label wrapping roller 73, whereby the label is wrapped smoothly and tightly around the can. Immediately this operation is completed the rock-arms 114, together with the other parts described, are raised, and the kickers 121 engaging the under side of the can thus labeled force it forward upon the inclined table 123, down which it rolls, as hereinbefore explained, and at the same instant the next can is rolled by the push-arms 104 up the curved portion 108 of the plane 106 and pushed into position upon the friction-rolls 110, so as to be ready to receive the next label when applied by the wrapping-roller.

All succeeding operations being repetitions of the ones described, it will be obvious that I have produced a can-labeling machine which is entirely automatic, rapid, positive, and reliable in action, which can be adjusted to accommodate cans of different sizes, and which is strong and durable of construction.

In adapting this machine to label cans or bottles of varying diameters the sizes of the sprocket-wheels 84 and 30 must be varied to increase or diminish the speed of the force-feed rollers and thereby the length of label.

It is to be understood, of course, that mechanical equivalents may be substituted for various parts of this machine and that many changes in the detail construction, form, and arrangement of the parts may be made without departing from the spirit and scope or sacrificing any of the advantages of my invention.

Having thus described the invention, what I claim as new, and desire to secure by Letters Patent, is—

1. In a can-labeling machine, a pair of rotating friction-rolls, a vertically-movable roller above the same, an adjustable label-guide having its free end below and rearward of the center of said roller, and means to synchronously sever the label and to cause the roller to depress the front or free end of the label-guide and press the front end of the label down upon the can interposed between said roller and the friction-rolls, for the purpose set forth.

2. In a can-labeling machine, a pair of rotating friction-rolls, a pivoted label-guide, a vertically-movable roller above the free or front end of said label-guide, and means to depress said roller and the free end of said guide until the interposed front end of the label is pressed firmly by the roller upon a can resting upon said friction-rolls, substantially as described.

3. In a can-labeling machine, a pair of rotating friction-rolls, a pivoted label-guide, a vertically-movable roller above the free or front end of said label-guide, means to depress said roller and the free end of said guide until the interposed front end of the label is pressed firmly by the roller upon a can resting upon said friction-rolls, and means to reëlevate said guide and said roller to their original positions, for the purpose set forth.

4. In a can-labeling machine, a pair of rotating friction-rolls, a pair of label-guides, one of them pivotally mounted, the delivery end of one being adjacent to and opposite the receiving end of the other, a vertically-movable roller above the front or free end of the advanced guide, means to feed the label longitudinally of said guides, and means to synchronously sever said label between the adjacent ends of said guides, and to depress the pivoted guide and press the advanced end of the completed or severed label by means of the depression of said roller firmly down upon a can arranged upon said friction-rolls, for the purpose set forth.

5. In a can-labeling machine, a pair of rotating friction-rolls, a reciprocatory frame carrying a roller vertically above said rolls, a movable label-guide to deliver the end of the label to the under side of said roller, means to depress said frame and cause its roller to press the label-guide down and the end of the label firmly upon a can resting upon the rotating friction-rolls, and means after the label is affixed to the can to reëlevate said frame and roller and the label-guide and means to discharge the labeled can from the machine, substantially as set forth.

6. In a can-labeling machine, a pair of rotating friction-rolls, a reciprocatory frame carrying a roller vertically above said rolls, a movable label-guide to deliver the end of the label to the under side of said roller, means to depress said frame and cause its roller to press the label-guide down and the end of the label firmly upon a can resting upon the rotating friction-rolls, and means after the label is affixed to the can to reëlevate said frame and roller and the label-guide and means to discharge the labeled can from the machine, and means to replace said can with another, substantially as described.

7. In a can-labeling machine, a pair of rolls, whereon the cans are labeled, a series of push-arms to deposit the cans upon the rolls, a series of reciprocatory kickers, and connections between the push-arms and the kickers whereby the latter are raised by the elevation of the former, substantially as and for the purpose set forth.

8. In a can-labeling machine, a support upon which the cans are labeled, a series of push-arms, a series of kickers, and eccentrically-disposed devices connecting between the push-arms and the kickers, substantially as described.

9. In a can-labeling machine, a pair of rolls upon which the cans are labeled, a pair of connected rock-frames eccentrically arranged, push-arms mounted on one and kickers on the other, and means to elevate said frames until the kicker-carrying frame is disconnected from the other.

10. In a can-labeling machine, a pair of rolls upon which the cans are labeled, a rock-frame provided with push-arms, a second and eccentrically-disposed rock-frame provided with kickers, and a dog carried thereby, which engages the push-arm rock-frame when depressed, and releases it after it has attained a predetermined elevation, substantially as described.

11. In a can-labeling machine, a pair of rolls, upon which the cans are labeled, a rock-frame provided with push-arms, a second and eccentrically-disposed rock-frame provided with kickers, a spring-actuated dog mounted upon the kicker-frame, means to depress the push-arm frame until it is engaged by the said dog, and means to synchronously elevate said frames until the push-arm frame is released by said dog, substantially as described.

12. In a can-labeling machine, a pair of friction-rolls upon which the cans are labeled, a rock-frame carrying pivotally a series of guided push-arms, a second and eccentrically-disposed rock-frame carrying pivotally a series of guided kickers, and means to elevate synchronously the push-arm frame and the kicker-frame until the latter has reached a predetermined elevation.

13. In a can-labeling machine, a pair of rock-frames pivoted eccentrically, push-arms mounted upon one of said frames, and kickers upon the other, a spring-actuated dog mounted upon the kicker-frame provided with a recess and a beveled shoulder leading thereto, means to depress the push-arm frame until it clears said shoulder and engages said recess, and means to synchronously elevate said push-arm frame and the kicker-frame until said dog releases the former and permits the kicker-frame to drop to its original position, substantially as described.

14. In a can-labeling machine, a pair of parallel annularly-grooved rolls upon which the cans are labeled, a series of push-arms to deposit the unlabeled cans upon said rolls, and a series of kickers working between said rolls and in said grooves, and adapted to dislodge the labeled cans from such position, substantially as described.

15. In a can-labeling machine, a pair of parallel rolls provided with annular registering grooves, a can-feeding plane or table leading thereto, a second plane or table leading therefrom, a series of push-arms, playing through the first-named table and adapted to deposit the unlabeled cans upon said rolls, and a series of kickers playing in the grooves of said rolls and adapted to dislodge the labeled cans from position, and deposit them upon the last-named plane or table, substantially as described.

16. In a can-labeling machine, a pair of rolls upon which the cans are labeled, a can-feeding table or plane leading thereto, a series of push-arms playing through openings of said table and successively depositing the unlabeled cans upon said rolls, a second plane or table to receive the labeled cans, and a series of kickers to remove the labeled cans from the rolls and deposit them upon said last-named plane or table, substantially as described.

17. In a can-labeling machine, a pair of parallel rolls upon which the cans are labeled, a can-feeding plane or table leading thereto and provided with an upwardly-curved extension overhanging the rearmost roll, and with guide-flanges for the cans, a series of push-arms playing through said table to deposit the unlabeled cans upon said rolls, and means to dislodge the cans when labeled from such position, substantially as described.

18. In a can-labeling machine, a pair of rolls, a rock-frame, push-arms carried by said rock-frame to deposit the unlabeled cans upon said rolls, a pin projecting from an arm of said rock-frame, and a driven grooved cam-wheel engaging said pin, substantially as and for the purpose set forth.

19. In a can-labeling machine, a cutting mechanism to successively sever labels from a continuously-fed web, a dog connected thereto, and a break-joint rock-frame adapted as it swings in one direction to strike said dog and operate the cutting mechanism, and as it swings back to again strike said dog "break" or yield to such contact without operating the cutting mechanism, and means to operate said rock-frame, substantially as described.

20. In a can-labeling machine, a cutting mechanism, a dog connected thereto, an extensible break-joint rock-frame consisting of a rock-shaft provided with arms, sliding arms mounted upon the first-named arms, and provided with pivoted extensions, and springs to realine said pivoted extensions with said sliding arms after each bending or breaking operation, and means to operate said rock-frame, substantially as described.

21. In a can-labeling machine, a pair of driven friction-rolls, a vertically-reciprocating frame, a roller carried thereby to press and wrap the labels on the cans, which successively rest upon said rolls, a standard adjustable with reference to the reciprocating frame, a label-guide extending from the standard to the under side of said roller, a cutting mechanism at the rear end of said label-guide and adapted to sever the labels successively from a continuous web, and an extensible break-joint rock-frame to accommodate the position of the cutting-mechanism standard, and to operate said cutting mechanism at regular intervals, substantially as described.

22. In a can-labeling machine, a standard, a stationary knife carried thereby, a movable knife above the same, a dog, a pull-rod pivoted to said dog and arranged to actuate said movable knife, an extensible break-joint rock-frame to engage said dog, and means to operate the rock-frame, substantially as described.

In testimony whereof I affix my signature in the presence of two witnesses.

JAMES T. MARLIN.

Witnesses:
M. R. REMLEY,
G. Y. THORPE.